United States Patent
Ono et al.

(10) Patent No.: US 9,458,267 B2
(45) Date of Patent: Oct. 4, 2016

(54) CHLORINATED POLYOLEFIN RESIN

(71) Applicant: NIPPON PAPER INDUSTRIES CO., LTD., Kita-ku (JP)

(72) Inventors: Isamu Ono, Yamaguchi (JP); Yuu Kitamura, Tokyo (JP); Takao Yoshimoto, Yamaguchi (JP); Masanori Tanaka, Yamaguchi (JP); Shunji Sekiguchi, Yamaguchi (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 0 days.

(21) Appl. No.: 14/779,097

(22) PCT Filed: Mar. 19, 2014

(86) PCT No.: PCT/JP2014/057608
§ 371 (c)(1),
(2) Date: Sep. 22, 2015

(87) PCT Pub. No.: WO2014/148576
PCT Pub. Date: Sep. 25, 2014

(65) Prior Publication Data
US 2016/0046741 A1   Feb. 18, 2016

(30) Foreign Application Priority Data
Mar. 22, 2013 (JP) .................. 2013-061052

(51) Int. Cl.
| | |
|---|---|
| *C08F 8/06* | (2006.01) |
| *C08F 8/20* | (2006.01) |
| *C08L 23/28* | (2006.01) |
| *C08L 23/30* | (2006.01) |
| *C09D 11/108* | (2014.01) |
| *C08F 110/06* | (2006.01) |
| *C09D 11/02* | (2014.01) |
| *C09D 11/106* | (2014.01) |

(52) U.S. Cl.
CPC .............. *C08F 110/06* (2013.01); *C08F 8/20* (2013.01); *C09D 11/02* (2013.01); *C09D 11/106* (2013.01); *C09D 11/108* (2013.01); *C08F 8/06* (2013.01); *C08L 23/28* (2013.01); *C08L 23/30* (2013.01)

(58) Field of Classification Search
CPC .............. C08F 8/06; C08F 8/20; C08F 8/22; C08L 23/28; C08L 23/30; C09D 11/106; C09D 11/108; C09D 11/02
USPC .................. 525/333.8, 334.1, 388
See application file for complete search history.

(56) References Cited

U.S. PATENT DOCUMENTS 4,612,052 A   9/1986 Schwartz
5,310,816 A * 5/1994 Pennington ............. C08L 27/06
                                                                525/239

FOREIGN PATENT DOCUMENTS

| | | |
|---|---|---|
| EP | 1 482 010 A1 | 12/2004 |
| JP | 61-174275 A | 8/1986 |
| JP | 1-301703 A | 12/1989 |
| JP | 5-271323 | * 10/1993 |
| JP | 5-271323 A | 10/1993 |
| JP | 5-271590 A | 10/1993 |
| JP | 7-258335 | * 10/1995 |
| JP | 7-258335 A | 10/1995 |
| JP | 8-253725 A | 10/1996 |
| JP | 11-323236 A | 11/1999 |
| JP | 2002-317137 A | 10/2002 |
| JP | 2005-132991 A | 5/2005 |
| KR | 2002-0093916 A | 12/2002 |
| KR | 10-0799642 B1 | 1/2008 |
| WO | 02/064690 A1 | 8/2002 |
| WO | 2013/121871 A1 | 8/2013 |

OTHER PUBLICATIONS http://www2.ups.edu/faculty/hanson/Spectroscopy/IR/IRfrequencies.html, "IR-frequencies" (2016).*
Dong et al., Iranian Polymer Journal, 16 (2007) 645-651.*
Extended European Search Report issued Feb. 2, 2016 in Patent Application No. 14768351.0.
Zhi-Qiang Zhao, et al., "Preparation of polyethylene-g-(polyacrylic acid) and its sodium salt ionomer by in-situ chlorinating graft copolymerization" e-Polymers, vol. 11, No. 1, XP055244147, 2011, 13 Pages.
Xue-Ru Dong, et al., "Synthesis of Acrylic Modified Chlorinated Polypropylene and its Solvent Solubility" Iranian Polymer Journal, vol. 16, No. 9, XP055244148, 2007, pp. 645-651.
Japanese Office Action issued Nov. 7, 2014 in Japanese Patent Application No. 2014-538015 (with English translation).
International Search Report issued Jun. 3, 2014 in PCT/JP2014/057608 filed Mar. 19, 2014.
Notice of Allowance issued Jul. 1, 2016, in Korean Patent Application No. 10-2015-7025794 filed Mar. 19, 2014.

* cited by examiner

*Primary Examiner* — Roberto Rabago
(74) *Attorney, Agent, or Firm* — Oblon, McClelland, Maier & Neustadt, L.L.P.

(57) ABSTRACT

It is an object of the present invention to provide a chlorinated polyolefin resin having favorable adhesion to a polyolefin resin and high solubility in a composition containing an alcohol-based solvent. The present invention provides a chlorinated polyolefin resin that exhibits, in infrared spectroscopy spectrum measurement, a peak area ratio A/B×100 of 10% or higher, a peak area ratio C/B×100 of 30 to 80%, and a peak area ratio A/C×100 of 30% or higher (wherein "A" is the area of a peak resulting from hydroxyl groups, "B" is the area of a peak resulting from methylene groups, and "C" is the area of a peak resulting from carbonyl groups). The present invention also provides an ink composition for gravure printing or flexography that contains the chlorinated polyolefin resin, a printed material obtained using the above composition, and a printing method using the above composition.

7 Claims, No Drawings

CHLORINATED POLYOLEFIN RESIN

TECHNICAL FIELD

The present invention relates to chlorinated polyolefin resins. More particularly, the present invention relates to a chlorinated polyolefin resin highly soluble in a solvent composition containing an alcohol-based solvent.

BACKGROUND

Thermoplastic resins are thermally deformable, and this property allows the resins to be formed not only into flat shapes such as sheet- and film-like shapes but also into certain shapes such as spherical, cylindrical, and box-like shapes and to be used as products in various forms. However, the thermoplastic resins are basically transparent, relatively soft, and susceptible to scratches. Therefore, their surface is subjected to printing and coating for the purpose of protection or improvement in their aesthetic appearances.

The thermoplastic resins include polar resins and nonpolar resins. Among the nonpolar resins, polyolefin-based resins such as polypropylene and polyethylene are inexpensive, have many good properties such as good moldability, chemical resistance, water resistance, electrical characteristics, and safety, and are therefore widely used in recent years.

However, unlike the polar resins such as acrylic-based resins and polyester-based resins, the polyolefin-based resins are nonpolar and crystalline and therefore have a problem in that inks, coatings, adhesives, etc. do not easily adhere to the resins.

One method proposed to improve the above problem relating to the adhesion is to add a polyolefin-based resin to the inks, coatings, adhesives, etc. The solubility of chlorinated polyolefin resins in solvents other than aromatic solvents is low. Therefore, these chlorinated polyolefin resins are generally used after dissolved in an aromatic solvent such as toluene.

However, recently, from the viewpoint of environmental problems, chlorinated polyolefin resin compositions that use a solvent containing no aromatic solvent such as toluene are required in coating sites and printing sites. In one proposal to address this requirement (see Patent Literature 1), the polarity of a chlorinated polyolefin resin is increased by subjecting the chlorinated polyolefin resin to oxidation treatment or by reacting the chlorinated polyolefin resin with an acrylic-based monomer to form a graft copolymer, whereby the solubility of the chlorinated polyolefin resin in non-aromatic solvents such as ester-based solvents and ketone-based solvents is improved.

RELATED ART DOCUMENTS

Patent Literature

Patent Literature 1: Japanese Patent Application Laid-Open No. Hei. 11-323236

SUMMARY OF THE INVENTION

Problem to be Solved by the Invention

In recent years, alcohol-based solvents having higher polarity than ester-based solvents and ketone-based solvents are increasingly used in combination with these solvents particularly for gravure printing inks or flexography inks for polyolefin-based resin films. The oxidation-treated chlorinated polyolefin resin disclosed in Patent Literature 1 has insufficient solubility in a solvent composition containing an alcohol-based solvent, and there is a need for improvement in solubility.

Accordingly, an object of the present invention is to provide a chlorinated polyolefin resin having good adhesion to a polyolefin resin and high solubility in a solvent composition containing an alcohol-based solvent.

Means for Solving Problem

The present invention provides the following [19 to [8].
[1] A chlorinated polyolefin resin that exhibits, in infrared spectroscopy spectrum measurement, a peak area ratio A/B×100 of 10% or higher, a peak area ratio C/B×100 of 30 to 80%, and a peak area ratio A/C×100 of 30% or higher (wherein "A" is an area of a peak resulting from hydroxyl groups, "B" is an area of a peak resulting from methylene groups, and "C" is an area of a peak resulting from carbonyl groups).
[2] The chlorinated polyolefin resin according to [1], wherein a content of chlorine is 10 to 50% by weight.
[3] An ink composition for gravure printing, comprising the chlorinated polyolefin resin according to [1] or [2].
[4] An ink composition for flexography, comprising the chlorinated polyolefin resin according to [1] or [2].
[5] A printed material obtained by a gravure printing method using the ink composition for gravure printing according to [3].
[6] A printed material obtained by a flexographic printing method using the ink composition for flexography according to [4].
[7] A gravure printing method using the ink composition for gravure printing according to [3].
[8] A flexographic printing method using the ink composition for flexography according to [4].

Effect of the Invention

According to the present invention, a chlorinated polyolefin resin having good adhesion to a polyolefin resin and high solubility in a solvent composition containing an alcohol-based solvent can be provided.

EMBODIMENTS FOR CARRYING OUT THE INVENTION

The chlorinated polyolefin resin of the present invention has at least a hydroxyl group, a carbonyl group, and a methylene group. Specifically, in infrared spectroscopy spectrum measurement, the chlorinated polyolefin resin of the present invention exhibits a peak area ratio A/B×100 of 10% or higher, a peak area ratio C/B×100 of 30 to 80%, and a peak area ratio A/C×100 of 30% or higher. More preferably the peak area ratio A/B×100 is 20% or higher, the peak area ratio C/B×100 is 40 to 70%, and the peak area ratio A/C×100 is 40% or higher.

"A" is the area of a peak resulting from the hydroxyl group and is generally the area of a peak at a wavelength of 3,265 $cm^{-1}$ to 3,616 $cm^{-1}$. "B" is the area of a peak resulting from the methylene group and is generally the area of a peak at a wavelength of 1,400 $cm^{-1}$ to 1500 $cm^{-1}$. "C" is the area of a peak resulting from the carbonyl group and is generally the area of a peak at a wavelength of 1,657 $cm^{-1}$ to 1,845 $cm^{-1}$.

The peak area ratio A/B×100 is 10% or higher and preferably 20% or higher. The upper limit of the peak area ratio A/B×100 is generally 50% or lower.

The peak area ratio C/B×100 is 30 to 80%. The lower limit of the peak area ratio C/B×100 is preferably 40% or higher. The upper limit of the peak area ratio C/B×100 is preferably 70% or lower.

The peak area ratio A/C×100 is 30% or higher. The lower limit of the peak area ratio A/C×100 is preferably 40% or higher. The peak area ratio A/C×100 is not especially limited, and the peak area ratio A/C×100 may be 100% or higher.

When the values of the A/B×100, C/B×100, and A/C×100 are as described above, sufficient solubility in a solvent composition containing an alcohol-based solvent is obtained. When the value of the C/B×100 is as described above, harmful effects caused by dehydrochlorination of the chlorinated polyolefin resin are prevented.

The reason that the chlorinated polyolefin resin of the present invention has excellent effects may be as follows. When the A/B×100, C/B×100, and A/C×100 in the chlorinated polyolefin resin fall within the above ranges, a larger number of hydrogen bonds are formed between the alcohol-based solvent and the chlorinated polyolefin resin, so that the affinity between the alcohol-based solvent and the chlorinated polyolefin resin is improved. Therefore, the chlorinated polyolefin resin of the present invention has high solubility in a solvent composition containing a polar solvent such as an alcohol. In the chlorinated polyolefin resin of the present invention, it is presumed that the hydroxyl groups and the methylene groups are present in the carbon skeleton of the chlorinated polyolefin resin and the carbonyl groups are present at the ends of the carbon skeleton.

Although the method of producing the chlorinated polyolefin resin of the present invention is not especially limited, examples of the production method may include the following methods.

A first example is as follows. First, a polyolefin resin is dispersed or dissolved in water or a medium such as carbon tetrachloride or chloroform. Next, at least one type or more of gas selected from air, oxygen, and ozone is blown in the presence of a catalyst or under irradiation with ultraviolet rays under increased pressure or at normal pressure in a temperature range of 50 to 120° C. before, during, or after a general chlorination reaction. A chlorinated polyolefin resin into which hydroxyl groups and carbonyl groups have been introduced can thereby be obtained. When the reaction temperature during blowing of the gas (for example, oxygen) is set to be high, a reduction in molecular weight (degradation) due to cleavage of the macromolecular chain proceeds at a fast rate. Therefore, when the air is blown in a conventional manner for the purpose of mainly degradation, it is preferable that the reaction temperature be relatively high. Meanwhile, when the reaction temperature is set to be low, the peak area ratio A/C×100 tends to increase.

A second example is as follows. First, a polyolefin resin into which hydroxyl groups and carbonyl groups have been introduced by thermal degradation treatment and irradiation with ultraviolet rays in air is dispersed or dissolved in water or a medium such as carbon tetrachloride or chloroform. Next, chlorine in a gas form is blown in the presence of a catalyst or under irradiation with ultraviolet rays under increased pressure or at normal pressure in a temperature range of 50 to 120° C. A chlorinated polyolefin resin into which hydroxyl groups and carbonyl groups have been introduced can thereby be obtained.

A chlorinated polyolefin resin into which hydroxyl groups and carbonyl groups have been introduced can also be obtained using a combination of the above two methods.

The amount of the hydroxyl groups and carbonyl groups introduced into the chlorinated polyolefin resin can be controlled by appropriately adjusting conditions such as the reaction temperature and the reaction time.

Although the polyolefin resin used as the raw material of the chlorinated polyolefin resin of the present invention is not especially limited, examples of the polyolefin resin may include crystalline polypropylenes, amorphous polypropylenes, ethylene-propylene copolymers, ethylene-propylene-diene copolymers, ethylene-propylene-α-olefin copolymers, propylene-α-olefin copolymers, and ethylene-vinyl acetate copolymers.

Each of the ethylene-propylene-α-olefin copolymers, propylene-α-olefin copolymers is a resin obtained by copolymerization of an α-olefin with ethylene-propylene or propylene as main components. The form of the copolymers is not especially limited, and examples of the copolymers may include block copolymers and random copolymers. Examples of the α-olefin component may include ethylene, 1-butene, 1-pentene, 1-hexene, 1-heptene, 1-octene, and 4-methyl-1-pentene. When a propylene-α-olefin copolymer is used as the raw material, it is preferable in terms of adhesion to a polyolefin resin that the content of the propylene component be 50% by mole or more.

An ethylene-vinyl acetate copolymer is a resin obtained by copolymerization of ethylene and a vinyl acetate monomer. Although the molar ratio of ethylene to vinyl acetate in the ethylene-vinyl acetate copolymer is especially limited, it is preferable in terms of adhesion to a polar material and the strength of a coating that the amount of the vinyl acetate component be 5 to 45% by mole.

One kind of polyolefin resin may be used alone as the raw material of the chlorinated polyolefin resin of the present invention, or two or more kinds thereof may be used in combination. The melting point of the polyolefin resin is preferably 100 to 180° C. and more preferably 120 to 170° C.

The content of chlorine in the chlorinated polyolefin resin of the present invention is generally 10 to 50% by weight, preferably 15 to 40% by weight, more preferably 30 to 40% by weight, and still more preferably 32 to 40% by weight. When the content of chlorine is 10% by weight or more, sufficient solubility in a composition containing an alcohol-based solvent can be obtained. Meanwhile, when the content of chlorine is 50% by weight or less, favorable adhesion to a polyolefin-based substrate can be maintained. The content of chlorine is a value measured according to JIS-K7229. Examples of the alcohol-based solvent may include ethanol, 1-propanol, 2-propanol, isopropyl alcohol, 1-butanol, 2-butanol, isobutyl alcohol, tert-butyl alcohol, and cyclohexanol.

Although the weight average molecular weight of the chlorinated polyolefin resin of the present invention is not especially limited, it is preferably 3,000 to 200,000. When the weight average molecular weight is 3,000 or more, the cohesion of the resin and its adhesion to a substrate can be maintained favorably. When the weight average molecular weight is 200,000 or less, compatibility with another resin can be maintained favorably.

The weight average molecular weight of the chlorinated polyolefin resin of the present invention is a value in terms of standard polystyrene measured by gel permeation chromatography (GPC) resin.

Generally, a stabilizer is added to the chlorinated polyolefin resin. Examples of the stabilizer may include epoxy compounds. Although the epoxy compounds is not especially limited, an epoxy compound compatible with the chlorinated resin is preferable. One example of the epoxy compound is a compound having an epoxy equivalent of about 100 to about 500 and having at least one epoxy group per molecule. Examples of the epoxy compound may include the following compounds: epoxidized vegetable oils (e.g., epoxidized soybean oil and epoxidized linseed oil) obtained by epoxidizing natural vegetable oils having an unsaturated group with a peracid such as peracetic acid; epoxidized fatty acid esters obtained by epoxidizing unsaturated fatty acids such as oleic acid, tall oil fatty acid, and soybean oil fatty acid; epoxidized alicyclic compounds such as epoxidized tetrahydrophthalate; ethers obtained by condensation of epichlorohydrin with bisphenol A or a polyol, such as bisphenol A glycidyl ether, ethylene glycol glycidyl ether, propylene glycol glycidyl ether, glycerol polyglycidyl ether, and sorbitol polyglycidyl ether; and monoepoxy compounds typified by butyl glycidyl ether, 2-ethylhexyl glycidyl ether, decyl glycidyl ether, stearyl glycidyl ether, allyl glycidyl ether, phenyl glycidyl ether, sec-butyl phenyl glycidyl ether, tert-butyl phenyl glycidyl ether, and phenol polyethylene oxide glycidyl ether. Other examples of the stabilizer may include stabilizers used for polyvinyl chloride resins. Examples of such stabilizers may include: metallic soaps such as calcium stearate and lead stearate; organometallic compounds such as dibutyltin dilaurate and dibutyl maleate; and hydrotalcite compounds. One kind of these stabilizers may be used alone, or two or more kinds thereof may be used in combination. The amount of the stabilizer added is preferably 1 to 20% by weight (in terms of solid content) with respect to the chlorinated polyolefin resin.

In the present invention, the measurement of the infrared spectroscopy spectrum of the chlorinated polyolefin resin and the measurement of the areas of the peaks may be performed on a chlorinated polyolefin resin containing no stabilizer. Specifically, in the present invention, the infrared spectroscopy spectrum of the chlorinated polyolefin resin and the areas of the peaks generally mean the infrared spectroscopy spectrum of a chlorinated polyolefin resin with no stabilizer added thereto and the areas of the peaks from this resin. For example, a chloroform solution of the resin is applied to a KBr plate and then dried, and its infrared absorption spectrum is measured using an infrared spectrophotometer. Then the area of each peak is analyzed. The infrared spectrophotometer used may be FT-IR-4100 (JASCO Corporation). When this apparatus is used, the areas of the peaks can be computed by analysis using attached software (Spectro Manager, JASCO Corporation). In a spectrum chart with the horizontal axis representing wave number ($cm^{-1}$) and the vertical axis representing absorbance, a baseline is drawn in the range of a peak resulting from a target functional group, and the area surrounded by the base line and the spectrum curve can be used as the area of the peak.

The chlorinated polyolefin resin of the present invention may be an acid-modified chlorinated polyolefin resin into which an α,β-unsaturated carboxylic acid and/or a derivative thereof has been introduced. Examples of the α,β-unsaturated carboxylic acid and derivatives thereof may include maleic acid, maleic anhydride, fumaric acid, citraconic acid, citraconic anhydride, mesaconic acid, itaconic acid, itaconic anhydride, aconitic acid, aconitic anhydride, himic anhydride, (meth)acrylic acid, and (meth)acrylate. Although the amount of the α,β-unsaturated carboxylic acid and/or derivatives thereof introduced is not especially limited, the amount introduced is preferably 0 to 20% by weight with respect to 100% by weight of the chlorinated polyolefin resin and more preferably 0 to 10% by weight.

The chlorinated polyolefin resin of the present invention is useful as a component of an ink composition. The ink composition is preferably an ink composition for gravure printing or an ink composition for flexography. The content of the chlorinated polyolefin resin in an ink composition for offset printing or an ink composition for flexography is preferably 1 to 30% by weight. Preferably, in terms of the object of the present invention, the ink composition further contains an alcohol-based solvent. When the ink composition contains an alcohol-based solvent, the content of the alcohol-based solvent is generally about 1 to about 30% by weight based on the total amount of the solvents in the ink composition. However, when the chlorinated polyolefin resin of the present invention is used, the amount of the alcohol-based solvent contained can be up to about 50% by weight. If necessary, the ink composition may comprise, in addition to the chlorinated polyolefin resin and the alcohol-based solvent, components generally comprised in the ink composition.

The ink composition for gravure printing in the present invention can be printed on various printing materials by a gravure printing method. The ink composition for flexography in the present invention can be printed on various printing materials by a flexographic printing method. Examples of the printing materials may include paper and resin films. Each of the gravure printing method and the flexographic printing method may be performed according to a routine procedure.

EXAMPLES

Production Example 1

5.0 kg of crystalline polypropylene (melting point: 145° C.) produced using a Ziegler-Natta catalyst as a polymerization catalyst was charged into a reaction vessel having a glass lining, and 33 L (liters, the same applies to the following) of chloroform was added to sufficiently dissolve the crystalline polypropylene at a temperature of 97° C. under a pressure of 0.2 MPa. Then 5.0 g of 2,2-azobisisobutyronitrile was added, and a chlorination reaction was performed while the pressure inside the vessel was controlled to be 0.2 MPa, whereby a reaction solution with a chlorine content of 37.0% by weight was obtained. During the chlorination reaction, oxygen was blown. The reaction solution obtained was applied to a KBr plate and dried, and the infrared absorption spectrum of the reaction solution dried was measured at 400 $cm^{-1}$ to 4,000 $cm^{-1}$ using an infrared spectrophotometer (FT-IR-4100, JASCO Corporation) and analyzed using attached software (Spectro Manager, JASCO Corporation). The results showed that A/B×100 was 19% and C/B×100 was 37%. Here, "A" is the area of a region surrounded by a base line and a spectrum curve resulting from hydroxyl groups at 3,265 $cm^{-1}$ to 3,616 $cm^{-1}$, "B" is the area of a region surrounded by the base line and a spectrum curve resulting from methylene groups at 1,400 $cm^{-1}$ to 1,500 $cm^{-1}$, and "C" is the area of a region surrounded by the base line and a spectrum curve resulting from carbonyl groups at 1,657 $cm^{-1}$ to 1,845 $cm^{-1}$. Next, an epoxy compound used as a stabilizer was added to the reaction solution obtained. Then the chloroform was removed using a vented twin screw extruder equipped with a vent port for removing the reaction solvent by evaporation under reduced pressure, and a chlorinated polyolefin resin was extruded into a strand form and cooled with water. Then the chlorinated polyolefin resin was pelletized using a water-cooling type pelletizer to thereby obtain the chlorinated polyolefin resin in a solid form. The chlorine content of the obtained chlorinated polyolefin resin was 34.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 2

A chlorinated polyolefin resin was produced in the same manner as in Production Example 1 except that the time of blowing of oxygen during the chlorination reaction was changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 20% and C/B×100 was 47%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin resin was 34.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 3

A chlorinated polyolefin resin was produced in the same manner as in Production Example 1 except that the time of blowing of oxygen during the chlorination reaction was changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 22% and C/B×100 was 65%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin resin was 34.0%. The weight average molecular weight (Mw) of the obtained chlorinated polyolefin composition that was computed using a standard polystyrene conversion method by gel permeation chromatography (GPC: HLC8320GPC, manufactured by TOSOH Corporation) was 10,000.

Production Example 4

A chlorinated polyolefin resin was produced in the same manner as in Production Example 1 except that the time of blowing of oxygen during the chlorination reaction was changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 26% and C/B×100 was 53%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin resin was 34.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 5

A chlorinated polyolefin resin was produced in the same manner as in Production Example 1 except that the time of blowing of oxygen during the chlorination reaction was changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 43% and C/B×100 was 41%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin composition was 34.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 6

A chlorinated polyolefin resin was produced in the same manner as in Production Example 1 except that the respective times of blowing of oxygen and chlorine gas were changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 20% and C/B×100 was 65%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin resin was 30.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 7

A chlorinated polyolefin resin was produced in the same manner as in Production Example 1 except that the respective times of blowing of oxygen and chlorine gas were changed. The non-solidified reaction solution containing no stabilizer was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 20% and C/B×100 was 50%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). The chlorine content of the obtained chlorinated polyolefin composition was 40.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 10,000.

Production Example 8

3.0 kg of crystalline polypropylene (melting point: 125° C.) produced using a metallocene catalyst as a polymerization catalyst was charged into a reaction vessel having a glass lining, and 33 L of chloroform was added to sufficiently dissolve the crystalline polypropylene at a temperature of 97° C. under a pressure of 0.2 MPa. Then 3.0 g of 2,2-azobisisobutyronitrile was added, and a chlorination reaction was performed while the pressure inside the vessel was controlled to be 0.20 MPa, whereby a reaction solution with a chlorine content of 33.0% by weight was obtained. During the chlorination reaction, oxygen was blown. The reaction solution obtained was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation). The results showed that A/B×100 was 9% and C/B×100 was 5%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). Next, an epoxy compound used as a stabilizer was added to the reaction solution obtained. Then the chloroform was removed using a vented twin screw extruder equipped with a vent port for removing the reaction solvent by evaporation under reduced pressure, and a chlorinated polyolefin composition was extruded into a strand form and cooled with water. Then the chlorinated polyolefin composition was pelletized using a water-cooling type pelletizer to obtain a chlorinated polyolefin resin in a solid form. The chlorine content of the obtained chlorinated polyolefin resin was 30.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 70,000.

Production Example 9

2.0 kg of crystalline polypropylene (melting point: 145° C.) produced using a Ziegler-Natta catalyst as a polymerization catalyst was charged into a reaction vessel having a glass lining, and 20 L of chloroform was added to sufficiently dissolve the crystalline polypropylene at a temperature of 97° C. under a pressure of 0.2 MPa. Then 2.0 g of 2,2-azobisisobutyronitrile was added, and a chlorination reaction was performed while the pressure inside the vessel was controlled to be 0.2 MPa, whereby a reaction solution with a chlorine content of 37.0% by weight was obtained. During the chlorination reaction, oxygen was blown. The reaction solution obtained was applied to a KBr plate and dried, and the infrared absorption spectrum of the reaction solution dried was collected at 400 cm$^{-1}$ to 4,000 cm$^{-1}$ using an infrared spectrophotometer (FT-IR-4100, JASCO Corporation) and analyzed using attached software (Spectro Manager, JASCO Corporation) in the same manner. The results showed that A/B×100 was 18% and C/B×100 was 25%. Here, "A" is the area at 3,265 cm$^{-1}$ to 3,616 cm$^{-1}$ (a peak resulting from hydroxyl groups), "B" is the area at 1,400 cm$^{-1}$ to 1,500 cm$^{-1}$ (a peak resulting from methylene groups), and "C" is the area at 1,657 cm$^{-1}$ to 1,845 cm$^{-1}$ (a peak resulting from carbonyl groups). Next, an epoxy compound used as a stabilizer was added to the reaction solution obtained. Then the chloroform was removed using a vented twin screw extruder equipped with a vent port for removing the reaction solvent by evaporation under reduced pressure, and a chlorinated polyolefin resin was extruded into a strand form and cooled with water. Then the chlorinated polyolefin resin was pelletized using a water-cooling type pelletizer to obtain the chlorinated polyolefin resin in a solid form. The chlorine content of the obtained chlorinated polyolefin resin was 36.0%. The weight average molecular weight (Mw) of the obtained chlorinated polyolefin resin that was computed using a standard polystyrene conversion method by gel permeation chromatography (GPC: HLC8320GPC, manufactured by TOSOH Corporation) was 30,000.

Example 1

15 g of the chlorinated polyolefin resin (solid) obtained in Production Example 1 was dissolved in 15 g of ethyl acetate to prepare a 50 wt % ethyl acetate solution, and 30 g of the solution was placed in a 100 mL glass sample bottle. 3 g of isopropyl alcohol (IPA) was added to the glass sample bottle, and the resultant solution was sufficiently stirred. Then solution was left to stand for 1 hour or longer, and the state of the solution was checked. Then the addition of 3 g of isopropyl alcohol was repeated, and the state of the solution was checked and evaluated each time after the addition of isopropyl alcohol. The entire procedure described above was performed inside a room maintained at 25° C.

Example 2

Evaluation was performed in the same manner as in Example 1 except that the chlorinated polyolefin resin obtained in Production Example 1 was changed to the chlorinated polyolefin resin obtained in Production Example 2.

Example 3

Evaluation was performed in the same manner as in Example 1 except that the chlorinated polyolefin resin obtained in Production Example 1 was changed to the chlorinated polyolefin resin obtained in Production Example 3.

Example 4

Evaluation was performed in the same manner as in Example 1 except that the chlorinated polyolefin resin obtained in Production Example 1 was changed to the chlorinated polyolefin resin obtained in Production Example 4.

Example 5

Evaluation was performed in the same manner as in Example 1 except that the chlorinated polyolefin resin obtained in Production Example 1 was changed to the chlorinated polyolefin resin obtained in Production Example 5.

Example 6

Evaluation was performed in the same manner as in Example 1 except that the chlorinated polyolefin resin obtained in Production Example 1 was changed to the chlorinated polyolefin resin obtained in Production Example 6.

Example 7

Evaluation was performed in the same manner as in Example 1 except that the chlorinated polyolefin resin obtained in Production Example 1 was changed to the chlorinated polyolefin resin obtained in Production Example 7.

Comparative Example 1

Evaluation was performed in the same manner as in Example 1 except that the chlorinated polyolefin resin obtained in Production Example 1 was changed to the chlorinated polyolefin resin obtained in Production Example 8.

Comparative Example 2

Evaluation was performed in the same manner as in Example 1 except that the chlorinated polyolefin resin obtained in Production Example 1 was changed to the chlorinated polyolefin resin obtained in Production Example 9.

TABLE 1

| | Example 1 | Example 2 | Example 3 | Example 4 | Example 5 | Example 6 | Example 7 | Comparative Example 1 | Comparative Example 2 |
|---|---|---|---|---|---|---|---|---|---|
| DEGREE OF CHLORINATION | 34.0 | 34.0 | 34.0 | 34.0 | 34.0 | 30.0 | 40.0 | 30.0 | 36.0 |
| PEAK AREA RATIO OF HYDROXYL GROUPS (%) | 19 | 20 | 22 | 26 | 43 | 20 | 20 | 9 | 18 |
| PEAK AREA RATIO OF CARBONYL GROUPS (%) | 37 | 47 | 65 | 53 | 41 | 65 | 50 | 5 | 25 |
| PEAK AREA RATIO OF HYDROXYL GROUPS/PEAK AREA RATIO OF CARBONYL GROUPS (%) | 51 | 43 | 34 | 49 | 105 | 31 | 40 | 176 | 72 |
| AMOUNT OF IPA ADDED IN ALCOHOL DILUTION TEST 0 g | CLEAR | CLEAR | CLEAR | CLEAR | CLEAR | CLEAR | CLEAR | SLIGHTLY CLOUDY | CLEAR |
| 3 g | CLEAR | CLEAR | CLEAR | CLEAR | CLEAR | CLEAR | CLEAR | CLOUDY | CLEAR |
| 6 g | CLEAR | CLEAR | CLEAR | CLEAR | CLEAR | CLEAR | CLEAR | SEPARATED INTO TWO LAYERS | CLEAR |
| 9 g | CLEAR | CLEAR | CLEAR | CLEAR | CLEAR | CLOUDY | CLEAR | — | SEPARATED INTO TWO LAYERS |
| 12 g | SEPARATED INTO TWO LAYERS | SEPARATED INTO TWO LAYERS | SLIGHTLY CLOUDY | SLIGHTLY CLOUDY | SLIGHTLY CLOUDY | CLOUDY | SLIGHTLY CLOUDY | — | — |
| 15 g | — | — | SEPARATED INTO TWO LAYERS | SEPARATED INTO TWO LAYERS | SEPARATED INTO TWO LAYERS | SEPARATED INTO TWO LAYERS | SEPARATED INTO TWO LAYERS | — | — |

The invention claimed is:

1. A chlorinated polyolefin resin wherein:
   the chlorinated polyolefin resin exhibits, in infrared spectroscopy spectrum measurement, a peak area ratio A/B×100 of 10% or higher,
   a peak area ratio C/B×100 of 30 to 80%, and
   a peak area ratio A/C×100 of 30% or higher,
   wherein "A" is an area of a peak resulting from hydroxyl groups, "B" is an area of a peak resulting from methylene groups, and "C" is an area of a peak resulting from carbonyl groups; and
   a content of chlorine is 10 to 50% by weight.

2. An ink composition for gravure printing, comprising the chlorinated polyolefin resin according to claim 1.

3. An ink composition for flexography, comprising the chlorinated polyolefin resin according to claim 1.

4. A printed material obtained by a gravure printing method using the ink composition for gravure printing according to claim 2.

5. A printed material obtained by a flexographic printing method using the ink composition for flexography according to claim 3.

6. A gravure printing method using the ink composition for gravure printing according to claim 2.

7. A flexographic printing method using the ink composition for flexography according to claim 3.

* * * * *